United States Patent [19]

Drobník et al.

[11] 4,097,470

[45] Jun. 27, 1978

[54] PREPARATION OF BIOGICALLY ACTIVE SUBSTANCES BEARING -NH$_2$ GROUPS IN A FORM RELEASABLE BY ENZYMATIC CLEAVAGE

[75] Inventors: Jaroslav Drobník; Jindřich Kopeček; Jiří Labský; Pavla Rejmanová; Josef Exner; Jaroslav Kalal, all of Prague, Czechoslovakia

[73] Assignee: Ceskoslovenska akademie ved, Prague, Czechoslovakia

[21] Appl. No.: 584,887

[22] Filed: Jun. 9, 1975

[30] Foreign Application Priority Data

Apr. 25, 1974 Czechoslovakia ............... 2958-74

[51] Int. Cl.$^2$ .................... C08F 16/28; C08F 24/00; C08F 210/00
[52] U.S. Cl. ...................... 260/78 A; 260/47 UA; 260/78 UA; 260/78.3 UA; 260/79.3 M; 260/857 TW; 424/81; 526/16; 526/23; 526/49; 526/50; 526/75; 260/DIG. 47
[58] Field of Search ............... 260/47 UA, 78.3 UA, 260/78 A, 78 UA, 79.3 M, 857 TW; 526/75, 23, 16, 49, 50; 424/81

[56] References Cited

U.S. PATENT DOCUMENTS

| | | | |
|---|---|---|---|
| 3,711,574 | 1/1973 | Jaworek et al. | 526/303 |
| 3,925,267 | 12/1975 | Coupek et al. | 526/303 |
| 3,931,111 | 1/1976 | Kopecek et al. | 526/16 |
| 3,959,237 | 1/1976 | Blank | 526/49 |
| 3,985,540 | 10/1976 | Fein et al. | 526/23 |
| 3,997,482 | 12/1976 | Turkova et al. | 526/16 |

*Primary Examiner*—Herbert J. Lilling

[57] ABSTRACT

Polymeric form of a biologically active compound containing at least one -NH$_2$ group in its molecule, adapted for the protracted release of said biologically active compound by enzymatic cleavage of the polymer in vivo in the organism. The active compound is bonded by its -NH$_2$ group to the carboxylic group of an L-amino acid as for instance, β-phenylalanine, tyrosine, tryptophane, lysine, arginine, glycine, alanine, leucine, citruline or ornithine, which latter is in twin bonded by its amino group to the terminal carboxylic group of the side chain of a substituted amide or ester of acrylic or methacrylic acid, said side chain constituting a linear moiety containing at least 3 carbon atoms. The latter compound or monomer is copolymerized with a hydrophilic monomer such as, N-alkylmethacrylamide, N-alkylacrylamide, N,N-dialkylacrylamide, wherein alkyl has 1-6 carbon atoms and may contain 1 to 3 OH groups, or glycol acrylate or methacrylate alone or in admixture, and which copolymer may contain further monomeric components, for example, cross-linking agents. It is the copolymer which constitutes the subject matter of the invention, i.e., the biologically active substance bearing -NH$_2$ groups in a form releasable by enzymatic cleavage. The copolymer can also be prepared using as the monomer a compound containing the bonded L-amino acid and in which the terminal carboxylic group has been converted to the reactive ester. The active compound is then bonded to the thusly prepared reactive polymer. The enzymatic release of the active compound bearing -NH$_2$ groups can be controlled, i.e., regulated by the size of the side chain carrying the L-amino acid.

9 Claims, No Drawings

PREPARATION OF BIOGICALLY ACTIVE SUBSTANCES BEARING -NH₂ GROUPS IN A FORM RELEASABLE BY ENZYMATIC CLEAVAGE

The invention relates to biologically active compounds containing —NH₂ groups in a form releasable by enzymatic cleavage and to a method for manufacturing the polymeric form of active substances. More particularly the invention relates to polymeric forms of a biologically active compound containing at least one —NH₂ group in its molecule, adapted for protracted release of said biologically active compound by enzymatic cleavage of the polymer, and to a method for producing the same.

The effect of many active compounds containing —NH₂ groups introduced into the biological environment is limited by their short residence time therein or by inactivation thereof in the said environment which necessitates the use of increased doses of such active compounds in the treatment of the indicated disease or condition.

In order to avoid the foregoing disadvantages, some substances are used in the form of their derivatives or complexes characterized by their low solubility which serve as a local depot releasing the active compound only very slowly.

The use of active compounds bonded to polymers has already been proposed. If the polymeric form of the substance per se is not active, the low-molecular-weight active compound has to be cleaved off. This cleavage is brought about by hydrolysis in some cases and proceeds at a suitable velocity which is, however then, difficult to control. The use of enzymatic hydrolysis has been proposed, but the nature of the chemical bond has not been specified nor prepared specified which is capable of being split by enzymes directly. In the one study in which enzymatic cleavability has been investigated, only, natural polymers or insoluble synthetic polymers have been used.

Now, it has been found that a chemical bond specific for enzymes can be provided in the side chain of synthetic polymers in an economically advantageous manner and that a biologically active compound containing —NH₂ groups may be bonded through this bond providing for the slow cleavage of this compound in its active form through the activity of enzymes present in the biological environment.

An object of the invention is a method for preparation of the polymeric form of a biologically active substance containing —NH₂ groups, wherein an active compound is bonded by its —NH₂ group to a side chain with the terminal -L-aminoacid specific for the selected system. This side chain is a part of the polymer unit and is present in the amount of 1 - 50 mol.%, preferably 1 - 15 mol.%, in a crosslinked or non-crosslinked copolymer containing a hydrophilic component selected from N-alkylmethacrylamide, N,N-dialkylacrylamide, N-alkylacrylamide, where alkyl has 1 to 6 carbon atoms and may contain 1 to 3 —OH groups, or glycol methacrylate or glycol acrylate, where glycol is ethylene glycol, propylene glycol, butylene glycol, diethylene glycol, triethylene glycol, or tetraethylene glycol, alone or in a mixture, the side chain between the polyvinylic chain and the active component having a minimum length of 6 atoms. A method for preparation of the polymeric form of the active substance according to the invention consists in condensing an N-substituted amide of acrylic or methacrylic acid, which contains at least three linear carbon atoms in its side chain terminated by a carboxylic carbon atom, with the -amine group of an aminoacid having an L-configuration and selected from a group comprising β-phenylalanine, tyrosine, tryptophane, lysine, arginine, glycine, alanine, leucine, citrulline, and ornithine, followed by bonding of the aminoacid carboxylic groups with the —NH₂ group of the active compound and the subsequent copolymerization of the resulting monomer with a hydrophilic monomeric component selected from N-alkylmethacrylamide, N-alkylacrylamide, N,N-dialkylacrylamide, wherein alkyl has 1 to 6 carbon atoms and may contain 1 to 3 —OH groups, or glycol methacrylate or glycol acrylate, wherein glycol is ethylene glycol, propylene glycol, butylene glycol, diethylene glycol, triethylene glycol and tetraethylene glycol, alone or in a mixture.

The procedure for manufacturing the polymeric form of the biologically active substance may also consist in bonding of a component, which forms an active ester, to the carboxylic group of the side chain or the terminal aminoacid by the known methods, instead of bonding the active component, so that an activated polymer is obtained after the above mentioned copolymerization, which is further used for bonding of the active component by its —NH₂ group or for bonding of an aminoacyl derivative of this active component with the aforesaid L-α-amino acid by the known methods.

The choice of the manufacturing method depends on the the copolymer used and, particularly, on the the active component. However, it is advantageous to first prepare the monomer which has the terminal carboxylic group for bonding the active component esterified with p-nitrophenol, 2,3,5-trichlorophenol, 8-hydroxyquinoline, 5-chloro-8-hydroxyquinoline, N-hydroxysuccinimide, or N-hydroxyphthalimide. This monomer is copolymerized with a substituted acrylamide or methacrylamide according to the Czechoslovak Patent Nr. . . . (PV 2879-74) corresponding to U.S. Application Ser. No. 568,777. The resulting copolymer is stable if stored in a cool place and under an inert atmosphere. It reacts in a suitable solvent with —NH₂ groups of the active component forming the above described cleavable bond.

A method for preparation of the above mentioned copolymers consists in the radical polymerization of the mixture of compounds in the presence of an initiator and in 2 to 75 percent solution in a low-molecular-weight compound (the precipitant), while the interaction parameter copolymer — the low-molecular-weight compound is higher than 0.6 at the temperature $-10°$ to $100°$ C.

Acetone, toluene, acetonitrile, hexane, diethylether, dibutylether, dioxane, a mixture of dodecyl alcohol - cyclohexanol, etc., may be advantageously used as low-molecular-weight compounds (precipitants), which cause phase separation in the course of polymerization or copolymerization.

Common initiators of the free-radical polymerization can be used, i.e., azo compounds, diacylperoxides, or known redox initiators, e.g. the system tertiary amine - dibenzoyl peroxide, and the like, especially if easily decomposing compounds or compounds reacting with the OH-group of hydroxyalkyl bonded to the amidic nitrogen of the comonomer at higher temperatures are copolymerized. The polymerization is carried out at the temperature $-10°$ to $100°$ C.

The procedure via reactive esters (see Example 2) is economical with respect to utilization of the active component and enables the preparation of the activated polymeric carrier for bonding of various active compounds.

The copolymerization steps of Examples 1 – 5 is carried out in accordance with the procedures set forth in one or more of the following lettered Examples.

EXAMPLE A (Examples 1 and 3 are conducted in accordance with the procedure of Example A)

A glass ampoule is charge with 3 g of N-(2-hydroxypropyl)-methacrylamide, 0.35 g of nitrophenyl N-methacryloylglycyclglycinate, 0.34 g of azobisisobutyronitrile and 35.5 g of acetone. The mixture was bubbled through with nitrogen to remove the dissolved oxygen, sealed and polymerized at 50° C. The precipitated polymer is separated on a fritted-glass filter after 8 hours, washed with acetone and dried. The yield is 72%. The content of nitrophenyl N-methacryloylglycylglycinate in the monomer mixture is 5.0 mol. % and in the polymer 5.3 mol. % according to the UV spectrometric analysis.

EXAMPLE B

The mixture consisting of 30 g of N-(2-hydroxypropyl) methacrylamide, 4.2 g of azobis(methyl isobutyrate), 3.5 g of nitrophenyl N-methacryloyldiglycylglycinate and 450 ml of acetone was polymerized for 12 hours at 60° C in a sealed glass ampoule. The yield was 70.8%.

EXAMPLE C

The mixture consisting of 1 g of N,N-diethylacrylamide, 0.25 g of methacryloylglycylglycine, 0.1 g of dibenzoyl peroxide, 0.1 g of triethylamine, 2 g of hexane, and 2 g of diethylether is polymerized for 10 hours at 25° C. The resulting polymer is filtered and dried. Carboxylic groups of the polymer are then transformed into nitrophenyl ester by the polymeranalogous reaction with nitrophenyl in the presence of dicyclohexylcarbodiimide. The copolymer which is modified in this way is activated and suitable for the reaction with biologically active compounds.

EXAMPLE D

The mixture consisting of 20 g of N-(2-hydroxypropyl)methacrylamide, 9 g of triethylene glycol monomethacrylate, 4 g of azobisisobutyronitrile, 3.5 g of nitrophenyl methacryloyldiglycylglycinate and 450 ml of acetone was placed in an ampoule bubbled through with nitrogen, sealed and polymerized for 12 hours at 55° C. The resulting polymer, after filtration, washing and drying, is suitable for bonding of biologically active compounds which contain amino groups. Examples 2 and 5 are conducted in accordance with the procedures of Examples B – D.

EXAMPLE E

The mixture of 8 g of N-(2-hydroxypropyl)methacrylamide, 0.8 g of nitrophenyl methacryloylglycinate, 1 g of trimethylolpropane trimethacrylate, 0.2 g of diisopropyl peroxocarbonate and 180 ml of toluene is polymerized by the procedure described in Example 12. The activated copolymer results which is suitable for bonding of biologically active compounds.

EXAMPLE F

The mixture consisting of 600 ml of paraffin oil, 7 g of polyvinylpyrrolidone, 3 g of azobisisobutyronitrile, 57 g of N-(2-hydroxypropyl)methacrylamide, 0.5 g of nitrophenyl methacryloylglycylglycinate and 118 g of ethylene dimethacrylate is polymerized by the procedure described in Example 15. Example 4 is conducted in accordance with the procedure of Examples E and F.

The polymeric form prepared by the method according to the invention has numerous advantages. It permits the control the physical and biological fate of the active compound by the nature and molecular weight of the carrier-polymer. The rate of cleavage can be controlled by the length of the side chain (cf. Example 3). The active component is protected by its bonding not only against elimination for the organism but also against its inactivation (e.g. the histamine bond in Example 4 makes the attack of histaminase, i.e. monoaminooxidase, impossible).

The invention is further illustrated in the following examples, without, however, limiting the scope of the invention.

EXAMPLE 1

A copolymer I containing 97.6 mol.% of N(2-hydroxypropyl)methacrylamide (HPMA) and 2.4 mol.% of N-methacryloylglycylphenylalanylnitranilide (MGPN) and a copolymer II containing 98.18 mol.% of HPMA and 1.82 mol.% of nitrophenyl N-(methacryloyl)glycinate was prepared by direct copolymerization according to the Czechoslovak Patent Nr. . . . . (V 2879-74). The copolymer II was dissolved in dimethylsulfoxide to provide a 10% solution and the same volume of a 0.5% solution of L-phenylalanyl-p-nitranilide (a) or glycyl-p-nitranilide (b) in the same solvent was added thereto. The mixture was allowed to stand overnight at 37° C. The copolymer was precipitated in a ten-fold excess of the acetone-ether mixture (1:1), washed, dissolved in dimethylformamide to form a 10% solution and lyophilized giving the KoIIa and KoIIb products, respectively. The products were used as substrates for the enzymatic cleavage in the procedure according to B. F. Erlanger, F. Edel and A. G. Cooper (Arch. Biochem. Biophys. 1966, 115, 206). N-(Succinyl)-L-phenylalanyl-p-nitranilide (SPNA) served as reference material.

The polymer with bonded glycyl-p-nitranilide did not exhibit any cleavage even after 24 hours of incubation. The cleavage rate of the polymer-bonded L-phenylalanylnitranilide reference (SPNA = 100%) is given in the following table:

| Initial content of nitranilide in the copolymer | Cleavage rate (SPNA = 100%) | |
|---|---|---|
| | Chymotrypsin | Pronase |
| KoI 2.4 mol.% | 23 % | — |
| KoIIa 1.25 mol.% | 15 % | 82 % |
| KoIIb 1.56 mol.% | 0 % | 0 % |

The results prove that the bond formed between the side chain and p-nitranilide as the model compound is accessible for enzyme cleavage when the side-chain length is only 6 atoms and that both products obtained by the direct copolymerization and by the polymeranalogous reaction of the activated polymer are equally suitable.

EXAMPLE 2

A copolymer IV containing 96 mol.% of HPMA and 4 mol.% of N-methacryloylglycylglycyl(L-phenylalanyl)nitranilide was prepared by the direct copolymerization according to the Czechoslovak Patent Nr. . . . (PV 2879-74) similarly as in Example 1. This polymer and the polymer KoI with bonded L-phenylalanyl-p-nitranilide described in the Example 1 (KoI) were used in various concentrations ($5 \times 10^{-5}$M, $10^{-4}$M, $2 \times 10^{-4}$M, $7 \times 10^{-4}$M, $10^{-3}$M, $5 \times 10^{-3}$M calculated on nitranilide) as substrates for cleavage by chymotrypsin according to the method disclosed in Example 1. The incubation for 24 hours was allowed at the concentration $7 \times 10^{-4}$M. The percentage of cleavage was then determined and if it did not reach 100%, fresh enzyme was added and incubation was carried out again for 2 hours. As far as the cleavage did not increase, the achieved percentage of cleavage was considered the limit value.

Constants $K_m$ (Michaelis' constant showing the enzyme affinity to the substrate) and $V_{max}$ (the maximum rate of cleavage showing the decomposition of an enzyme-substrate complex to enzyme and product) were calculated from the results. The results in the following table show that the cleavage rate as well as the limit cleavage can be advantageously controlled by the length of the side chain.

| Substrate | $K_m$(mM) | $V_{max}$ | Limit cleavage |
|---|---|---|---|
| SPNA | 0.086 | 1.00 | 100 % |
| KoI | 2.0 | 0.7 | 28.9 % |
| KoIV | 2.22 | 8.7 | 100 % |

EXAMPLE 3

N-(Phenylalanyl)histamine was prepared by the method described by H. Arold and L. Rietschel (Z. Chem. 1969, 9, 144) and used in the polymeranalogous reaction with the copolymer KoII described in Example 1. The copolymer (KoV) was obtained which contained 1.1% of N(N'-(methacryloyl)glycyl)-L-phenylalanylhistamine units. It was incubated with chymotrypsin by the method described in Example 1. The released histamine was determined according P. A. Shore, A. Burkhalter and V. H. Cohn, Jr. (J. Pharmacol. exp. theor. 127, 182, 1959). The initial concentration of the bonded histamine was $1 \times 10^{-3}$M and the chymotrypsin concentration 0.5 mg/ml. The initial cleavage rate was constant for 80 minutes with the slope K = $1.2 \times 10^{-6}$ mole min$^{-1}$mg$^{-1}$. The limit cleavage was 28%.

EXAMPLE 4

An activated copolymer of N-(2-hydroxypropyl)methacrylamide with nitrophenyl methacryloylglycylglycinate crosslinked with trimethylolpropane trimethacrylate, prepared according to the Czechoslovak Patent Nr. . . . (PV 2879-74) was dispersed in dimethylformamide to the 5% w/w suspension. Dimethylformamide solutions of N-phenylalanyl,N'-isonicotinylhydrazide hydrochloride (2 ml of 0.5% solution) and triethylamine (0.1 ml of 3% solution) were added to 2 ml of the suspension under continuous stirring. The mixture was allowed to stand at 37° C overnight and the polymer was isolated by centrifugation and washed with water as long as the washings gave reaction on addition of chloride. The suspension of the product was incubated with chymotrypsin under the same conditions as in Example 1. Hydrazide or isonicotinic acid cleaved after 2 hours was determined in the supernatant after centrifugation spectrophotometrically. The amount cleaved after this time recalculated to the whole amount of the polymer was 1.8 mg.

EXAMPLE 5

The following copolymers were prepared, reprecipitated and refined according to the Czechoslovak Patent Nr. . . . (PV 2879-74): 93.2 mol.% of N-ethylacrylamide with 6.8 mol.% of MGPN (see Example 2), 97.3 mol.% of N-acryloylmorpholine with 2.7 mol.% of MGPN, and 92 mol.% of triethylene glycolmonomethacrylate with 8 mol.% of MGPN. The enzymatic cleavability of p-nitranilide was tested analogously as in Example 1. The cleavage was followed at 37° C for 15 minutes and expressed in percent of the reference SPNA cleavage amounting 15.2, 23.5 and 18.7%, respectively.

We claim:

1. Polymeric form of a biologically active compound containing at least one —NH$_2$ group adapted for the protracted release of the biologically active compound by enzymatic cleavage of the polymer in vivo in the organism comprising a copolymer of 1) a compound in which said active compound is bonded by its —NH$_2$ group to the carboxylic group of an L-amino acid which in twin is bonded by its amino group to the terminal carboxylic group of the side chain of a substituted amide or ester of acrylic or methacrylic acid, said side chain containing a linear moiety containing at least three carbon atoms, with 2) a hydrophilic monomer selected from the group of N-alkylmethacrylamide, N-alkylacrylamide, N,N-dialkylacrylamide, wherein alkyl has 1 to 6 carbon atoms and may contain 1 to 3 OH groups, glycol methacrylate, glycol acrylate, and mixtures thereof.

2. A polymer according to claim 1, wherein said L-amino acid is selected from β-phenylalanine, tyrosine, tryptophane, lysine, arginine, glycine, alanine, lencine, citrulline and ornithine.

3. A polymer according to claim 1, wherein glycol in said glycol monomer is ethylene glycol, propylene glycol, butylene glycol, diethylene glycol, triethylene glycol and tetraethylene glycol.

4. A polymer according to claim 1, wherein said copolymer includes a further monomeric component.

5. A polymer according to claim 4, wherein said further monomeric component is a cross-linking agent.

6. Method of preparing a polymeric form of a biologically active compound containing at least one —NH$_2$ group adapted for the protracted release of the biologically active compounds by enzymatic cleavage of the polymer in vivo in an organism, which comprises the steps of:

(1) copolymerizing a monomeric component having the general formula:

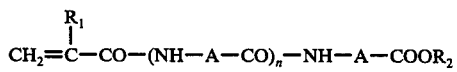

wherein R$_1$ is H or C H$_3$, A is the portion of an amino acid other than the NH$_2$ and COOH groups, said amino acid having an L-configuration and being selected from the groups consisting of beta-phenylalanine, tyrosine, tryptophane, lysine, arginine, glycine, alanine, leucine, citrulline and ornithine, $R_2$ is the radical form of p-nitrophenol, 2, 3, 5-trichlorophenol, 8-hydroxyquinoline, 5-chloro-8-hydroxyquinoline, N-hydroxysuccinimide or N-hydroxyphthalimide, and $n$ is 0 or 1 with a hydrophilic monomer selected from the group consisting of N-alkylmethacrylamide, N-alkylacrylamide, N,N-dialkylacrylamide, wherein alkyl has 1 to 6 carbon atoms and may contain 1 to 3 —OH groups, glycol methacrylate and glycol acrylate, wherein glycol is ethylene glycol, propylene glycol, butylene glycol, diethylene glycol, triethylene glycol or tetraethylene glycol, alone or in a mixture by means of free-radical polymerization in a 2-75% solution of monomers a low-molecular-weight precipitant, the interaction parameter polymer-low-molecular-weight precipitant being higher than 0.6, at a temperature of −10° to 100° C., and
  (2) and reacting said L-amino acids and a biologically active compound containing at least one —NH₂ group selected from the group consisting of p-nitroaniline, histamine and isonicotinylhydrazide, either by copolymerizing said amino acid and said biologically active compounds with the other reactants in step (1) or by subsequently reacting said amino acid and said biologically active compounds with the copolymeric product of step (1) by dissolving said copolymeric product in dimethyl sulfoxide or dispersing said copolymeric product in dimethyl formamide and mixing therewith a dimethyl formamide solution of said amino acid and said biologically active compounds allowing the resulting mixture to stand overnight at a slightly elevated temperature and, in either case, recovering the polymeric form of said biologically active compounds.

7. The method of claim 6 wherein said monomeric component with the specified general formula, said hydrophilic monomer, said L-amino acid and said biologically active compounds are all copolymerized in step (1).

8. The method of claim 6 wherein said monomeric component with the specified general formula and said hydrophilic monomer are copolymerized in step (1), and the resulting copolymeric product is subsequently reacted with said L-amino acid and said biologically active compounds.

9. Method of preparing a polymeric form of a biologically active compound containing at least one —NH₂ group adapted for the protracted release of the biologically active compounds by enzymatic cleavage of the polymer in vivo in an organism, which comprises the steps of:
  (1) copolymerizing a monomeric component having the general formula:

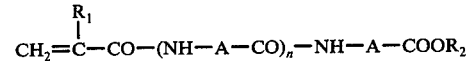

wherein $R_1$ is H or $CH_3$, A is the portion of an amino acid other than the $NH_2$ and COOH groups, said amino acid having an L-configuration and being selected from the groups consisting of beta-phenylalanine, tyrosine, tryptophane, lysine, arginine, glycine, alanine, leucine, citrulline and ornithine, $R_2$ is the radical form of p-nitrophenol, 2, 3, 5-trichlorophenol, 8-hydroxyquinoline, 5-chloro-8-hydroxyquinoline, N-hydroxysuccinimide or N-hydroxyphthalimide, and $n$ is 0 or 1 with a hydrophilic monomer selected from the group consisting of N-alkylmethacrylamide, N-alkylacrylamide, N,N-dialkylacrylamide, wherein alkyl has 1 to 6 carbon atoms and may contain 1 to 3 —OH groups, glycol methacrylate and glycol acrylate, wherein glycol is ethylene glycol, propylene glycol, butylene glycol, diethylene glycol, triethylene glycol or tetraethylene glycol, alone or in a mixture by means of free-radical polymerization in a 2-75% solution of monomers in a low-molecular-weight precipitant, the interaction parameter polymer-low-molecular-weight precipitant being higher than 0.6, at a temperature of −10° to 100° C., and
  (2) and reacting a biologically active compound containing at least one —NH₂ group selected from the group consisting of p-nitroaniline, histamine and isonicotinylhydrazide with the copolymeric product of step (1) by dissolving said copolymeric product in dimethyl sulfoxide or dimethyl formamide and mixing therewith a dimethyl formamide or dimethyl sulfoxide solution of said biologically active compounds, allowing the resulting mixture to stand overnight and recovering the polymeric form of said biologically active compounds.

* * * * *